US006202982B1

United States Patent
Huguet et al.

(10) Patent No.: US 6,202,982 B1
(45) Date of Patent: Mar. 20, 2001

(54) DEVICE FOR COUPLING AN APPLIANCE TO A CARTRIDGE OF PRESSURIZED FLUID

(75) Inventors: Alain Huguet, Caluire et Cuire; Franck Mandica, Ecully; Eric Carrato, Vaulx-Milieu; Guy Magnouloux, Brignais, all of (FR)

(73) Assignee: Application des Gaz, Saint Genis Laval (FR)

( * ) Notice: Subject to any disclaimer, the term of this patent is extended or adjusted under 35 U.S.C. 154(b) by 0 days.

(21) Appl. No.: 09/374,417

(22) Filed: Aug. 13, 1999

(30) Foreign Application Priority Data

Aug. 14, 1998 (FR) .................................................. 98 10523

(51) Int. Cl.⁷ ................................. F24C 5/18; F16L 37/28
(52) U.S. Cl. ..................................... 251/149.9; 251/149.6; 251/144; 251/251; 126/38
(58) Field of Search ................................ 251/904, 149.9, 251/149.6, 144, 143, 149.1, 251; 126/38; 137/320, 321; 222/402.13, 402.14, 402.15

(56) References Cited

U.S. PATENT DOCUMENTS

| 3,522,928 | * | 8/1970 | Henriques | 251/144 |
|---|---|---|---|---|
| 3,601,290 | * | 8/1971 | Nigro | 222/402.13 |
| 3,684,190 | | 8/1972 | Bletcher et al. | . |
| 4,092,974 | * | 6/1978 | Zenzaburo | 126/38 |
| 5,060,982 | * | 10/1991 | Matsushita | 251/149.9 |
| 5,070,858 | * | 12/1991 | Wang | 126/38 |
| 5,083,681 | * | 1/1992 | Nye | 222/402.13 X |
| 5,525,771 | * | 6/1996 | Lund | 431/256 |
| 5,725,033 | * | 3/1998 | Steinkaemper et al. | 251/149.9 |
| 5,868,126 | * | 2/1999 | Long et al. | 126/38 |
| 5,911,403 | * | 6/1999 | DeCler et al. | 251/904 |
| 5,954,044 | * | 9/1999 | Schmidt et al. | 126/38 |
| 5,988,212 | * | 9/1999 | Drayer et al. | 251/149.9 |
| 6,019,348 | * | 2/2000 | Powell | 251/144 |

FOREIGN PATENT DOCUMENTS

| 0278873 | 8/1988 | (EP) . |
|---|---|---|
| 2353793 | 12/1977 | (FR) . |
| 2376999 | 8/1978 | (FR) . |

\* cited by examiner

Primary Examiner—Joseph A. Kaufman
Assistant Examiner—Eric Keasel
(74) Attorney, Agent, or Firm—Kramer, Levin, Naftalis & Frankel LLP

(57) ABSTRACT

Members for pushing the tabs of an annular part include radial studs forming cams, there being as many of these as there are catching tabs, the cams having the same distribution as the tabs into the gaps between which they are inserted in the unlocked position, each tab being equipped with a cylindrical or cam-shaped internal bearing surface capable of bearing on one of the studs in order, by reaction, to push its external catching tooth radially outward, the annular part being connected to a turning member which has a restricted angular travel between two positions, namely an unlocked and identified rotational position of the annular part, in which position the tabs are free to flex, and a locked rotational position of the annular part, in which position the tabs are locked and pushed back by their respective studs, and locked under the rolled rim.

6 Claims, 3 Drawing Sheets

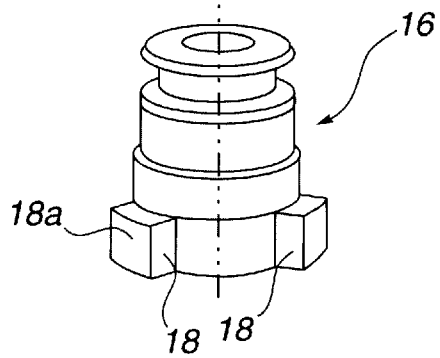
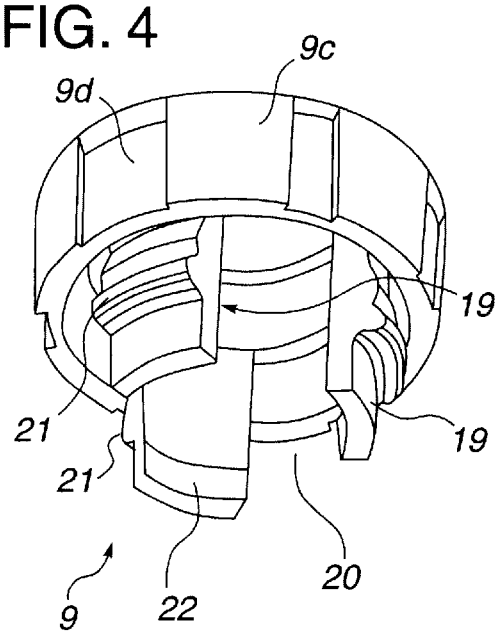
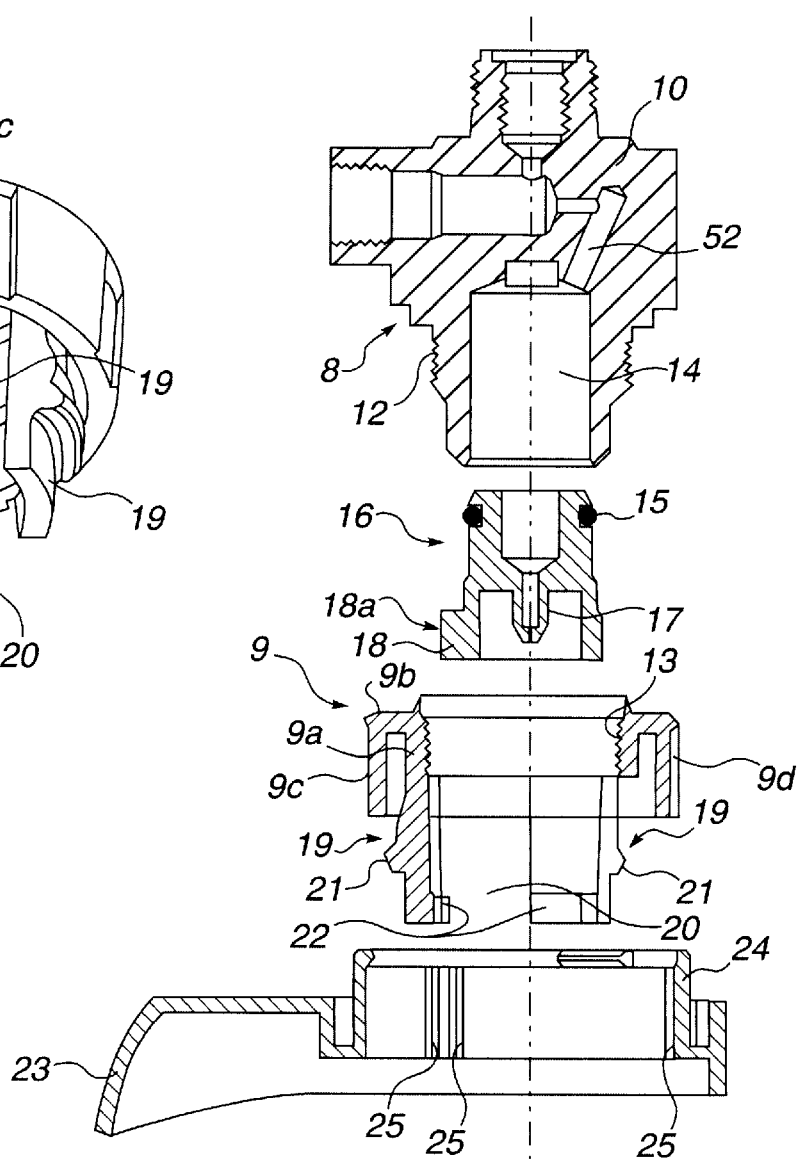

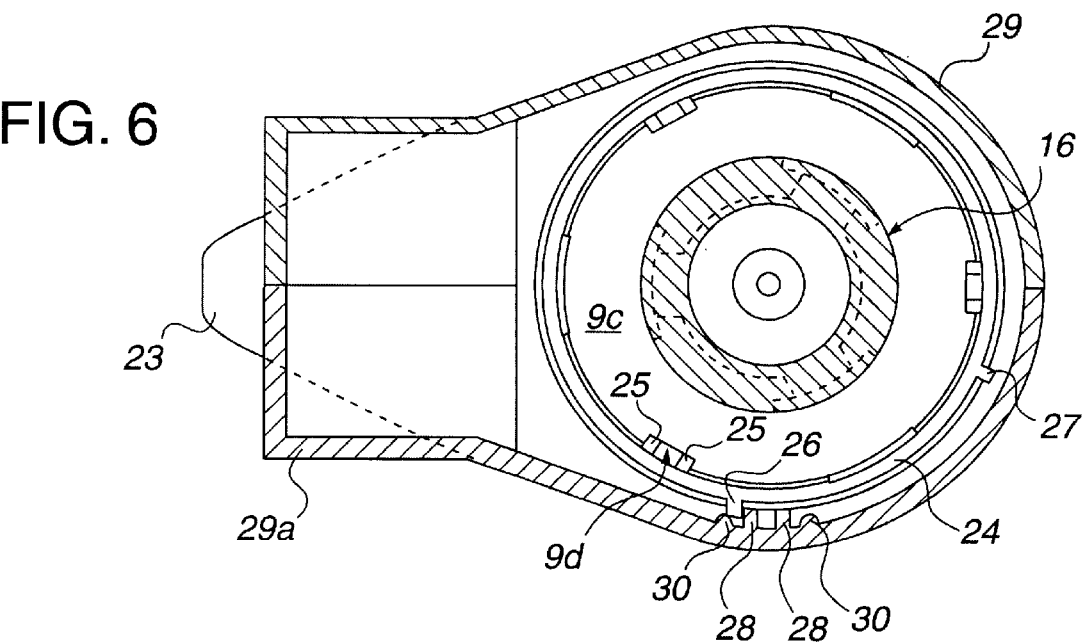
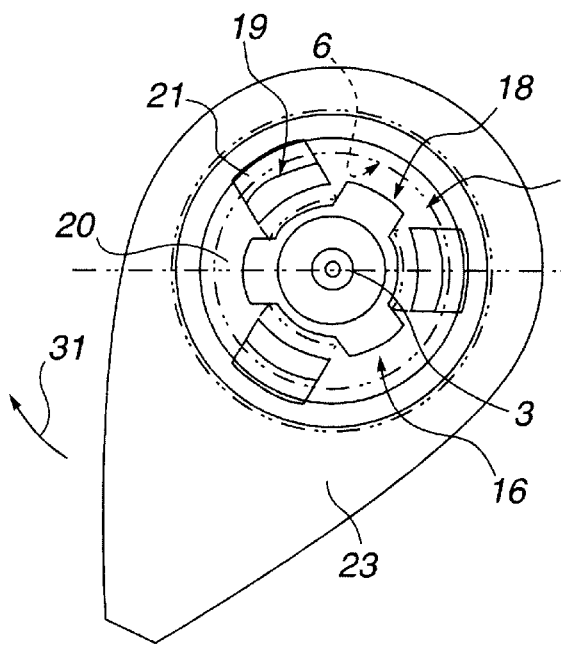
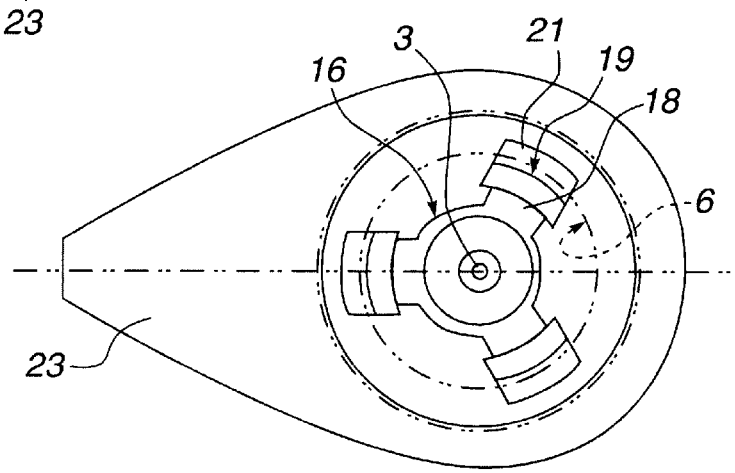

DEVICE FOR COUPLING AN APPLIANCE TO A CARTRIDGE OF PRESSURIZED FLUID

FIELD OF THE INVENTION

The present invention relates to a device allowing the quick coupling or uncoupling of:

a cartridge of pressurized fluid, such as a liquefied petroleum gas, for example butane, the cartridge (disposable container) including a withdrawing valve with a rolled annular rim surrounding the valve head, and an appliance that consumes this fluid for various purposes.

The coupling fulfills two separate functions, namely, on the one hand, makes a positive connection between the appliance and the cartridge and, on the other hand, opens the valve and provides a leak-tight connection between cartridge and appliance.

BACKGROUND INFORMATION

European patent application no. 0 278 873 discloses a coupling device made up of:

a central core secured to the appliance and comprising the means for withdrawing the fluid, these means being designed to interact in a leak-tight manner with the valve head of the cartridge, and means for conveying the withdrawn fluid toward the appliance, and an annular part which can pivot around the core and comprises a number of elastic and Longitudinal catching tabs distributed about its axis, forming gaps between them, each tab being equipped with an external radial catching tooth and with an internal bearing surface which can interact with a thrusting member secured to the central core, in order to push each catching tooth back into and under the rolled annular rim of the cartridge.

In this device, in which the annular part is screwed onto the central core, the coupling procedure requires the annular part to be manipulated first in one direction, in order to bring its thrusting members away from the interior bearing surfaces of the elastic tabs and then, after the catching teeth of the tabs have clipped into the rolled annular rim of the cartridge, turned in the opposite direction and over a number of turns, in order to bring the thrusting members back against the interior bearing surfaces of the tabs and make their catching teeth engage and lock in the rolled rim. Although simple, this procedure requires that the annular part be rotated in opposite directions and for a number of turns.

SUMMARY OF THE INVENTION

An object of the present invention is to overcome these drawbacks by providing a coupling device which is even easier to handle and which can be perceived or identified by the operator.

To this end, in the device according to an exemplary embodiment of the present invention, the members for pushing the tabs of the annular part include radial studs forming cams, there being as many of these as there are catching tabs, and these cams having the same distribution as these tabs into the gaps between which they are inserted in the unlocked position, while each tab is equipped with a cylindrical or cam-shaped internal bearing surface capable of bearing on one of the studs in order, by reaction, to push its external catching tooth radially outward, and said annular part is rotationally connected to a turning member which has a restricted angular travel between two positions, namely an unlocked and identified rotational position of the annular part, in which position the tabs are free to flex, and a locked rotational position of the annular part, in which position the tabs are locked under the rolled rim of the cartridge, and pushed back by their respective studs.

Thus, with this device, the movement from the unlocked position into the locked position takes place by relative rotation between the central core and the annular part, over a short angular travel that corresponds to the travel needed by an elastic tab to move it from its unlocked position, in which it is free to flex and is between two studs, into its locked position, in which its bearing surface is resting against and pushed back by a stud.

In one exemplary embodiment of the present invention, the turning member connected to the annular part includes a lever projecting radially from one side, and this lever is equipped, in its hub, with at least one stop capable of interacting with a complementary stop projecting radially inside a cap secured to the central core, this cap at least partially surrounding the annular part and the hub of the lever.

These two stops limit the rotational movement of the lever and of the annular part to the travel needed to change from one of the positions of the coupling device to the other.

Advantageously, with a cap that forms an essentially radial protrusion, the stops made on the lever and on the cap are arranged in such a way that in the locked position the lever is essentially aligned parallel to and below the protrusion, and so that in the unlocked position it forms an angle, for example of the order of 60°, with respect to its locked position.

With this arrangement, the operator coupling the appliance to a cartridge can, with the one hand holding the appliance, on the one hand, engage the part of the coupling device vertically into the bowl of the valve of the cartridge, thus opening this valve and, at the same time, using a finger, move the lever to bring it from its unlocked position into its locked position.

Furthermore, this particular position of the lever in the locked position provides a visual indication that this position has been achieved and, conversely, immediately indicates any lack of locked coupling.

Other features and advantages will emerge from the description which follows with reference to the appended diagrammatic drawing which depicts, by way of example, one exemplary embodiment of this device in its application to a cooking stove with just one burner.

BRIEF DESCRIPTION OF THE DRAWING

FIG. 2 is a view in longitudinal section showing the various components of coupling device according to an exemplary embodiment of the present invention.

FIGS. 3 and 4 are perspective views of, respectively, the part bearing the locking studs and the annular part comprising the tabs which interact with the studs, belonging to the coupling device according to FIG. 2.

FIG. 6 is a section on VI—VI of FIG. 5.

FIGS. 7 and 8 are diagrammatic views showing, from below, the relative positions of the studs and elastic tabs of the coupling device, when they are, respectively, in the unlocked position and in the locked position according to an exemplary embodiment of the present invention.

DETAILED DESCRIPTION

Figure 5:
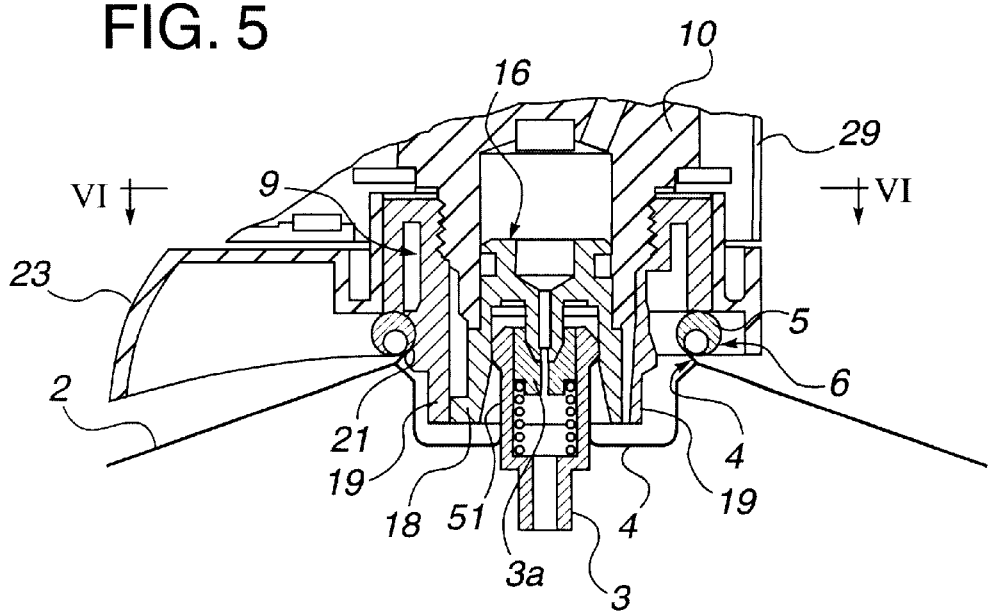
FIG. 5 is a part view in cross-section showing the various elements according to FIG. 2, when they are assembled and in the coupled position on the rolled rim of the valve of a cartridge.

The coupling device according to an embodiment of the present invention is intended to interact with, for example, a cartridge (disposable container) of pressurized fluid, and especially burnable gas which, as shown in greater detail in FIG. 5, includes a reservoir 2 to which is crimped a valve 3 comprising an axial bowl 4, itself connected to the reservoir 2 by its edge being rolled over the rolled edge of the reservoir 2, with a seal 5 inserted in between. This method of connection forms on the cartridge a rolled annular rim 6 which is raised above an internal groove 7 formed in the bowl 4 and surrounds the valve head 51.

The coupling device of the appliance includes a central core 8, an annular part 9, a cylindrical part 16, and a turning member 23.

In the exemplary embodiment depicted, the central core 8 forms part of a metal body 10 itself belonging to a tap and forming a support for a burner 1. However, it is obvious that this body could be shaped differently depending on the end use of the appliance. As shown in FIGS. 2 and 5, the central core 8 is equipped with an external screw thread 12 onto which the annular part 9, which has a tapped bore 13, can be screwed. This part 10 also includes a blind axial bore 14 which is open downward, and into which a cylindrical part 16 is push-fitted tightly and sealed with a seal 15. This cylindrical part has an axial end piece 17 for opening the valve element 3a of the valve 3 and, on the outside, has radially projecting studs 18 which have peripheral faces that form cams 18a. The core 8 also has means 52 for conveying the withdrawn gas.

The annular part 9 is made up of, for example, a hub 9a, a flange 9b and a peripheral skirt 9c. The hub 9a, which has the tapping 13, is extended downward by longitudinal tabs 19 of which there are three in this exemplary embodiment and which are distributed angularly 120° apart, forming gaps 20, visible in FIG. 4, between them.

Each of these longitudinal tabs 19 is elastically deformable and has, projecting from its outer face, a catching tooth 21 capable of entering the groove 7 of the bowl 4 of a cartridge 2 and, on the inside, a cylindrical bearing surface 22 which has a smaller diameter than the diameter across the cylindrical faces 18a formed on each stud 18 of the part 16 connected to the central core 8. FIG. 7 shows that the gaps 20 between the elastic tabs 19 are designed to accommodate the studs 18 of the part 16, of which there are the same number and which have the same distribution as these tabs. A comparison between FIG. 7 and FIG. 8 reveals that any relative rotation of the annular part 9 with respect to the core 8, and therefore with respect to the cylindrical part 16, brings the cylindrical bearing surfaces 22 of the elastic tabs 19 against the cylindrical bearing surfaces 18a of the studs 18, thus radially parting these tabs and making them move outward, and positively engaging their catching teeth 21 in the groove 7 of the cartridge 2, and that this can be achieved for a small travel which, in this embodiment, is 60° at most.

It is emphasized that to facilitate the interaction between the bearing surfaces 22 and the bearing surfaces 18a of the studs 18, one of these bearing surfaces, for example 22, may be in the shape of a cam.

The annular part 9 is secured to a turning member which, in this exemplary embodiment, includes a lever 23 secured to a hub 24 fitting onto the annular skirt 9c of said part 9. The hub 24 includes, on its inside, longitudinal projections 25 which fit into longitudinal grooves 9d of said skirt 9c to allow the annular part to be rotated. The object of this rotation is to bring the part 9 from its unlocked position shown in FIG. 7 into its locked position shown in FIG. 8, a rotation which is restricted in both directions.

In the exemplary embodiment depicted in FIG. 6, this restriction is achieved, on the one hand, by two longitudinal ribs 26 and 27 projecting from the outer face of the hub 24 to form stops and, on the other hand, by at least one rib 28, and in this instance two in FIG. 6, projecting from the interior face of a two-part cap 29a. As shown in FIG. 5, this cap envelops the body 10 of the appliance, and therefore the central core 8 and part of the hub 24 and of the annular part 9.

Figure 1:
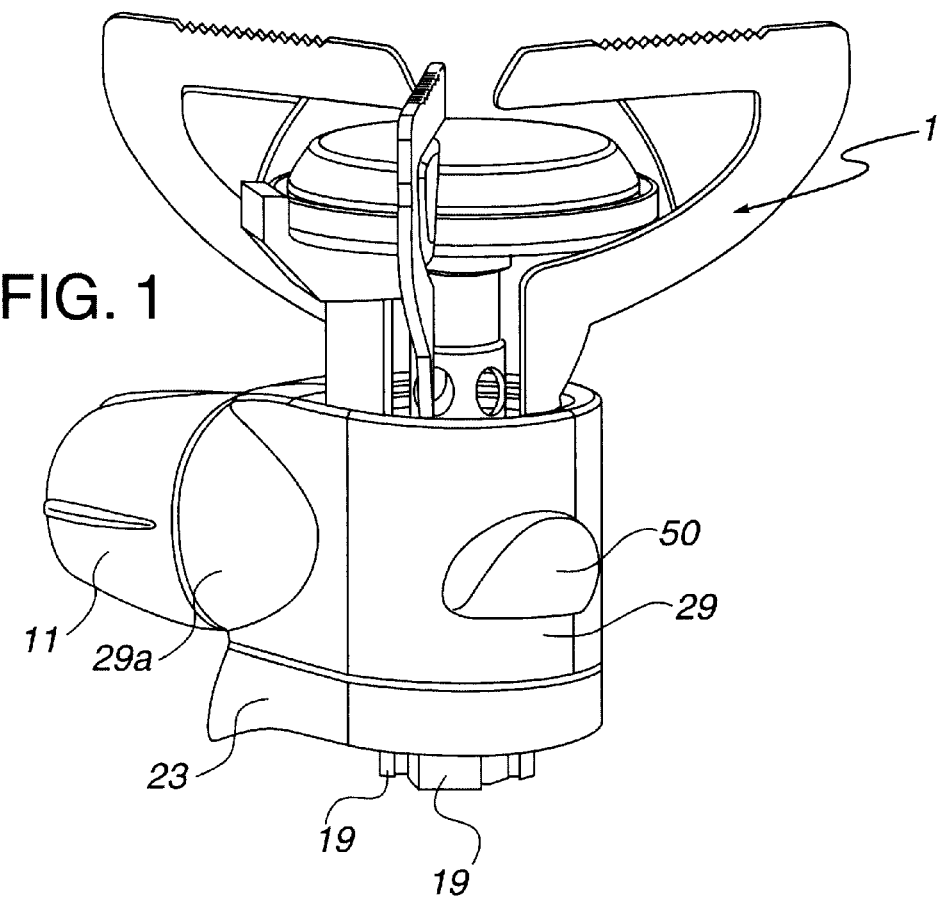
FIG. 1 is a perspective view of the entire stove incorporating a coupling device according to an exemplary embodiment of the present invention.

As a preference, as shown in FIG. 1, the cap 29 in cross-section has an oblong or airplane wing shape, making it easier for the appliance to be held in the hand, even with just one hand, while at the same time being able to operate the gas control knob 11 or a button 50 for operating a piezoelectric ignition device.

When, on account of the structure of the appliance, for example the presence of a tap with the control knob 11, the cap 29 has an appreciably radial protrusion 29a, the ribs 26, 27 and 28 are distributed, as shown in FIG. 6, in such a way that in the locked rotational position, the free end of the lever 23 lies essentially parallel to and below this protrusion 29a, and so that in the unlocked rotational position it is in the position depicted in FIG. 7.

As far as the user is concerned, this gives a direct visual indication as to whether the coupling device according to an embodiment of the present invention is in the locked or in the unlocked position.

FIG. 6 shows that the stationary stop formed by the two ribs 28 is preceded on each side by a rolled rim 30, spaced angularly from said ribs. Thus, any force on the lever 23 to bring it from one position to the other, for example from the locked position depicted in FIG. 6 into the unlocked position of FIG. 7, requires the exertion of a starting force which is higher in order to allow the stop 26 to escape from the rolled rim 30 and then, at the end of the travel, requires a higher force to be exerted again in order to make the stop 27 pass over the other rolled rim 30. Thus, these rolled rims have not only a locking function but also a sensitive function indicating the end of the travel. In an alternative form, the rolled rim 30 is provided only on the same side as the stationary stop 28 indicating the locked position.

With an appliance equipped with the coupling device according to an embodiment of the present invention and including a radial protrusion 29a for coupling the appliance to a cartridge 2 of gas, the appliance is grasped, for example, in one hand via the protrusion and the lower part of the annular part 9 which protrudes from the cap 29 is inserted into the bowl 4 of the cartridge 2, held in the other hand. If the lever 23 is in the unlocked position, the ends of the elastic tabs 19 are free to flex and can therefore, under the engaging force imparted to them, deform elastically inward as their external catching teeth 21 press on the edge of the rolled rim 6 of the cartridge. At the end of engagement, the end piece 17 of the cylindrical part 16 penetrates the head 51 of the valve 3 and causes the valve element 3a to move back whilst, at the same time, on account of the elasticity of the tabs, the catching teeth 21 enter the groove 7 under the rolled rim 6. To lock it, the operator has merely to pivot the lever 23 in the direction of the arrow 31 in FIG. 6 until this lever is aligned below the protrusion 29*a*, as shown in FIG. 6. The operator can manipulate the lever using one of his digits, for example his thumb, while the rest of his hand continues to press the appliance down vertically onto the cartridge.

It is clear from the foregoing that, thanks to its structure, this device requires the lever 23 to be pivoted angularly over a very short travel, both for coupling the appliance to a cartridge of gas in a locked way and for uncoupling it, and that, when the appliance has a radial projection, such as the protrusion 29*a*, the alignment of the lever with said projection gives an immediate and a visual indication thus identifying whether the appliance is correctly coupled to the cartridge.

What is claimed is:

1. An assembly for coupling an appliance to a cartridge of pressurized fluid, said assembly comprising:

a central core secured to said appliance along a longitudinal axis, the central core comprising a conduit for conveying a withdrawn fluid toward the appliance, a cylindrical part sealed to the central core and having radially projecting studs and an axial end piece for opening a valve of the cartridge, the axial end piece extending along the longitudinal axis within the cylindrical part, an annular part pivotally attached around the longitudinal axis of the core and comprising a number of elastic and longitudinal catching tabs distributed circumferentially about the longitudinal axis, the tabs forming gaps between one another, each tab having an external radial catching tooth and an internal bearing surface, the internal bearing surface capable of interacting with a corresponding projecting stud to push each catching tooth back into and under a rolled annular rim surrounding a valve head of the cartridge, and a turning member engaging the annular part, having a restricted angular travel to rotate the annular part between an unlocked rotational position, in which the tabs are free to flex, and a locked rotational position, in which the respective studs lock the tabs and push back the catching teeth into and under the rolled annular rim;

wherein each stud forms a cam, there being as many studs as there are catching tabs, and the cams being distributed so as to fit within the gaps between the tabs when the annular part is in the unlocked position.

2. The assembly as claimed in claim 1, wherein the turning member engaging the annular part comprises a lever projecting radially from a hub encircling the annular part, the hub equipped with at least one stop extending outward from the hub, the at least one stop able to engage an at least one complementary stationary stop projecting radially inward from a cap secured to the central core, the cap at least partially surrounding the annular part and the hub, and the annular part being in the locked rotational position when the at least one stop and the at least one complementary stationary stop are engaged.

3. The assembly as claimed in claim 2, wherein the cap forms a radial protrusion, and the at least one stop and the at least one complementary stationary stop are arranged and distributed in such a way that said lever is essentially in line with the radial protrusion when the annular part is in the locked rotational position.

4. The assembly as claimed in claim 2, wherein the at least one complementary stationary stop has on at least one side a rolled rim, the rolled rim being spaced from the at least one complementary stationary stop by approximately the width of the at least one stop and the rolled rim engaging the at least one stop on the lever in order to form an end-of-travel detector.

5. The assembly as claimed in claim 2, wherein the cap has one of an oblong cross-section or a droplet-shaped cross-section.

6. A valve coupling assembly for the coupling of an appliance to a valve head of a cartridge containing pressurized fluid, the valve coupling assembly comprising:

a central core adapted for attachment to the appliance, the central core delimiting a passageway through which the pressurized fluid passes to the appliance, the passageway including a first axial bore along a longitudinal axis of the central core, the first axial bore forming a first opening on the underside of the central core;

a cylindrical part located within the first opening of the first axial bore and having a sealed interface with the first axial bore, the cylindrical part including a second axial bore forming a second opening, the second axial bore containing an axial end piece for penetrating a valve within the valve head when the valve head is inserted into the second opening, the axial end piece being located along the longitudinal axis within the second axial bore, and the cylindrical part having radially projecting studs around the second opening of the second axial bore, the studs having peripheral faces forming cams, the studs being separated by spaces wider than the studs;

an annular part rotateably attached to the central core around the first axial bore, the annular part having longitudinal tabs extending away from the first opening of the central core, the longitudinal tabs being narrower than the spaces, the longitudinal tabs forming gaps between one another, the gaps being wider than the studs, each tab having a cylindrical bearing surface on an interior perimeter and a catching tooth on an exterior perimeter, the catching tooth formed so as to fit tightly within an internal groove formed along an inner side of a rolled annular rim of a valve bowl on the cartridge, the valve bowl surrounding the valve head; and a turning member having a hub surrounding the annular part and a lever extending radially from the hub, an interior surface of the hub having longitudinal projections that engage longitudinal grooves formed on an outer perimeter of the annular part, the turning member rotating the annular part when the lever is rotated about the longitudinal axis, the turning member capable of rotating between an unlocked position and a locked position, the unlocked position permitting flexion of the tabs, and the locked position prohibiting flexion of the tabs;

wherein beginning from the unlocked position, the longitudinal tabs flex inward between the studs as the catching teeth round the rolled annular rim when the valve coupling assembly engages the valve bowl of the cartridge, the longitudinal tabs thereafter sliding into the internal groove as the tabs flex outward, the longitudinal tabs being braced against the rolled annular rim as the turning member rotates the annular part about the longitudinal axis from the unlocked position to the locked position, causing the cams of the studs to engage the cylindrical bearing surfaces of the tabs, pushing the tabs outward.

* * * * *